United States Patent
Shimizu et al.

(10) Patent No.: US 8,697,165 B2
(45) Date of Patent: Apr. 15, 2014

(54) PROCESS FOR PRODUCING EDIBLE OIL

(75) Inventors: Masao Shimizu, Sumida-ku (JP); Noboru Matsuo, Sumida-ku (JP); Naoto Kudo, Sumida-ku (JP); Yoshinobu Nakajima, Chuo-ku (JP)

(73) Assignee: Kao Corporation, Tokyo (JP)

( * ) Notice: Subject to any disclaimer, the term of this patent is extended or adjusted under 35 U.S.C. 154(b) by 374 days.

(21) Appl. No.: 12/812,192

(22) PCT Filed: Jan. 8, 2009

(86) PCT No.: PCT/JP2009/050500
§ 371 (c)(1),
(2), (4) Date: Jul. 8, 2010

(87) PCT Pub. No.: WO2009/088096
PCT Pub. Date: Jul. 16, 2009

(65) Prior Publication Data
US 2010/0291274 A1 Nov. 18, 2010

(30) Foreign Application Priority Data

Jan. 9, 2008 (JP) ................................. 2008-001856

(51) Int. Cl.
*C11B 1/06* (2006.01)
*C11B 1/10* (2006.01)

(52) U.S. Cl.
USPC ............................. 426/429; 426/425; 426/417

(58) Field of Classification Search
USPC .......................... 426/601, 417, 425, 429, 638
See application file for complete search history.

(56) References Cited

U.S. PATENT DOCUMENTS

| | | | |
|---|---|---|---|
| 2,282,797 A | 5/1942 | Musher et al. | |
| 5,077,071 A | 12/1991 | Strop | |
| 5,725,900 A * | 3/1998 | De Sadeleer et al. | 426/601 |
| 5,912,042 A * | 6/1999 | Cain et al. | 426/607 |
| 6,743,930 B2 * | 6/2004 | Li | 554/12 |
| 6,858,247 B2 * | 2/2005 | Sakai et al. | 426/611 |
| 7,182,971 B2 * | 2/2007 | Takase et al. | 426/601 |
| 2002/0028272 A1 * | 3/2002 | Junghanns et al. | 426/417 |

FOREIGN PATENT DOCUMENTS

| | | | |
|---|---|---|---|
| EP | 0849353 | * | 6/1988 |
| JP | 1-218549 | | 8/1989 |
| JP | 5-146251 | | 6/1993 |
| JP | 2002-285188 | | 10/2002 |
| JP | 2005-213333 | | 8/2005 |
| JP | 2007-6851 | | 1/2007 |
| JP | 2007-37470 | | 2/2007 |
| WO | WO 98/38268 | | 9/1998 |

OTHER PUBLICATIONS

Papadopoulos, G. 1991. JAOCS 68(9)669.*
Gutfinger, T. 1981. JAOCS 58(11)966.*
Watt, B. 1963. Composition of Foods. USDA, Washington DC, p. 88-89.*
R.L. Williams, et all., "Natural Antioxidants", Chemistry, Health Effects, and Applications, AOCS Press, 1997.
Luz S. Artajo, et al., "Transfer of Phenolic, Compounds During Olive Oil Extraction in relation to Ripening Stage of the Fruit", Journal of the Science of Food and Agriculture, 86, 518-527, 2006.
International Search Report issued Aug. 10, 2009, in PCT/JP2009/050500 filed on Jan. 8, 2009.

* cited by examiner

*Primary Examiner* — Carolyn Paden
(74) *Attorney, Agent, or Firm* — Oblon, Spivak, McClelland, Maier & Neustadt, L.L.P.

(57) ABSTRACT

The present invention provides means of allowing an edible oil to contain useful components derived from an oil-containing raw material, such as polyphenols, efficiently. The present invention is a process for producing an edible oil, wherein when the edible oil is expressed from an oil-containing raw material, a diacylglycerol-containing oil or fat is added to the oil-containing raw material so that the diacylglycerol content in the oil or fat obtained after the oil expression is 4% by weight or more.

13 Claims, No Drawings

PROCESS FOR PRODUCING EDIBLE OIL

FIELD OF THE INVENTION

The present invention relates to a process for producing an edible oil from a raw material containing oil or fat.

BACKGROUND OF THE INVENTION

Polyphenol is known as a representative of pigments and bitter-tasting components contained in fruits or plant seeds. This ingredient has been used in foods or cosmetics since a long time ago. In recent years, however, attention is increasingly focused on its health benefits (e.g., the suppressing effect of tea catechins on body fat), in large part because of the red wine boom incited by the so-called French paradox (Non-Patent Document 1). The amount of polyphenols contained in edible oil is small in the case of a refined oil such as salad oil, but on the other hand, this amount is relatively high in the case of a non-refined expressed oil such as olive oil or sesame oil. However, the existing oil expression technologies are problematic in that most of the polyphenols obtained by such technologies tend to stay behind as a residue in the by-product emerged after oil expression, without being obtained in the expressed oil (Non-Patent Document 2). To address this problem, there is known a method and apparatus for extracting useful components from a raw material by allowing a refined oil to be impregnated into the raw material and then subjecting to compression (Patent Document 1).

There are also other known methods designed to transfer useful components, such as flavor or antioxidant components, into an extracted oil by allowing an oil seed raw material or oil cake thereof to be mixed with a flavorless oil such as a refined oil. Examples of such methods include: a method which, as a means to extract useful components from plant bodies, includes transferring flavor or antioxidant components into a refined oil by allowing oil fruit/seed, cacao beans or rice bran to be mixed with a refined oil such as rapeseed oil, heat treatment, followed by oil separation (Patent Documents 2 and 3); a method which includes transferring flavor of a food material into a liquid oil such as a refined oil by allowing the food material to be pulverized in the liquid oil (Patent Document 4); and a method which includes producing a flavored oil by allowing oil seeds and spices to be expressed at the same time (Patent Document 5).

[Non-Patent Document 1] Shahidi F, Natural Antioxidant, Chemistry, Health Effects and Application, AOCS press, 1997
[Non-Patent Document 2] Artajo et al., J Sci Food Agric 86:518, 2006
[Patent Document 1] JP-A-2002-285188
[Patent Document 2] JP-A-05-146251
[Patent Document 3] JP-A-01-218549
[Patent Document 4] JP-A-2007-37470
[Patent Document 5] JP-A-2007-6851

SUMMARY OF THE INVENTION

The present invention provides a process for producing an edible oil, wherein when the edible oil is expressed from an oil-containing raw material, a diacylglycerol-containing oil or fat is added to the oil-containing raw material so that the diacylglycerol content in the oil or fat obtained after oil expression is 4% by weight or more.

DETAILED DESCRIPTION OF THE INVENTION

Of the prior art methods illustrated above, the method, wherein oil is expressed from a raw material after a refined oil is permeated thereinto, is intended to obtain flavor components and various plant extracts which are usually capable of dissolving into an ordinary oil or fat composed mainly of triacylglycerol. As one of the other prior art methods, the method, wherein flavor or antioxidant components are extracted, is intended to add a flavor property to an oil having no sufficient amount of useful ingredients (e.g., refined oil), by mixing a small amount of a flavorful material into the oil or fat as a main constituent. The method, wherein oil seeds and spices are expressed at the same time, is intended to add another flavor property to ordinary expressed oil. Hence, these technologies are not relevant to a problem aimed at providing a process which allows an edible oil to contain useful components, such as polyphenols, efficiently.

The present invention provides a process capable of incorporating useful components, such as polyphenols in an oil seed raw material or the like, in an edible oil expressed from an oil-containing raw material, such as an oil seed raw material, efficiently, in a very simple manner.

The present inventors carried out research for a new process by which useful components (e.g., polyphenols) can be efficiently incorporated in an expressed oil when an edible oil is expressed from an oil-containing raw material. As a result, it has been found that the effectiveness of the process is remarkably enhanced when an oil or fat having a specific character is added to the oil-containing raw material prior to separating the expressed oil from the oil-containing raw material.

The present invention enables an edible oil to contain useful components such as polyphenols efficiently.

Examples of the oil-containing raw materials used in the present invention include olive fruit, sesame seeds (including roasted sesame seeds), evening primrose seeds, camellia seeds, coffee beans (including roasted coffee beans), linseeds (including roasted linseeds), rapeseeds (including roasted rapeseeds), rice bran, nuts such as walnuts and almonds, avocado fruit, pumpkin seeds, grape seeds, soy beans, corn germs, safflower seeds, sunflower seeds, cottonseeds, olive seeds, wheat bran, or the oil cake left after one or more times of oil expression therefrom. Of these oil-containing raw materials, olive fruit, sesame seeds (including roasted sesame seeds), roasted rapeseeds, rice bran, nuts such as walnuts and almonds, or the oil cake left after one or more times of oil expression therefrom are preferable from the viewpoint of useful components' content or versatility as edible oil. Olive fruit, sesame seeds (including roasted sesame seeds), rice bran, nuts such as walnuts and almonds, or the oil cake left after one or more times of oil expression therefrom are more preferable.

Examples of the useful components contained in oil-containing raw materials and used in the present invention include flavonoids such as apigenin, luteolin, quercetin, rutin, genistin, daidzein, hesperetin, hesperidin, catechin, anthocyanin, cyanidine and carthamin; simple polyphenols such as theaflavin, caffeic acid, chlorogenic acid, sesamin, sesamol, ellagic acid, tyrosol, hydroxytyrosol, oleuropein, curcumin, shogaol, resveratrol and capsaicin: polymer polyphenols such as proanthocyanidin and condensed tannin; alcohols such as sterol and octacosanol; and carotenoids such as astaxanthin and β-carotene.

Examples of the methods of expressing oil from an oil-containing raw material used in the present invention include (1) a method in which the oil-containing raw material is ground and filtered using a filter press or the like to obtain oil; (2) a method in which the oil-containing raw material is filtered using a screw press to obtain oil directly from the raw material; and (3) a method in which the oil-containing raw material is ground and the oil is separated by centrifugation or decantation. In order to make oil expressed from olive fruit, for example, it is common to grind olive fruit with a mill and separate the oil by means of a centrifugal separator. In order to make oil expressed from sesame seeds, it is common to directly separate off an oil portion by means of a screw press. The oil expression is preferably carried out at ambient temperatures. For example, in a cold press method which is employed in oil expression from olive fruit or macadamia nuts, the oil expression is preferably carried out at a temperature of 40° C. or lower.

In order for an edible oil to be expressed from an oil-containing raw material, according to the present invention, a diacylglycerol-containing oil or fat is added to the oil-containing raw material so that the diacylglycerol content in the oil or fat obtained after the oil expression is 4% by weight (hereinafter shown simply by "%") or more. From the viewpoint of allowing an edible oil to contain useful components such as polyphenols efficiently, an oil or fat that contains diacylglycerol is added to the oil-containing raw material so that the diacylglycerol content in the fat or oil obtained after the oil expression is preferably 7% or more, more preferably 10% or more, even more preferably 20 to 80% and even more preferably 30 to 70%.

In the present invention, the amount of the diacylglycerol-containing oil or fat to be added upon oil expression is preferably 0.5 to 50 parts by weight (hereinafter shown simply by "parts") relative to 100 parts of oil-containing raw material, from the viewpoint of extracting useful components in an oil-containing raw material at high concentrations and efficiently, with being more preferably 1 to 45 parts, even more preferably 3 to 40 parts, and even more preferably 5 to 30 parts. The efficiency of extracting useful components in an oil-containing raw material when adding the diacylglycerol-containing oil or fat differs depending on the characters of the useful components contained. Thus, the amount of the oil or fat to be added when expressing oil from the oil-containing raw material is determined using, as a measure, the amount that allows the content of the useful components in the oil or fat obtained after the oil expression to be preferably at least 20%, more preferably at least 50%, and even more preferably at least 70%, higher than the content of useful components in the oil or fat obtained after the oil expression where no diacylglycerol-containing oil or fat is added. The term "edible oil" used herein means the oil or fat obtained by adding the "oil or fat to be added upon oil expression" as described above to the "oil-containing raw material" as described above and expressing oil from the oil-containing raw material. The "edible oil" is also referred to as "separated oil" in Examples.

In the present invention, it is also preferable, from the viewpoint of allowing an edible oil to contain useful components such as polyphenols efficiently, to mix the edible oil obtained from an unexpressed oil-containing raw material by the process of the present invention and the edible oil obtained from the oil cake, as an oil-containing raw material, which is produced after one- or more-fold oil expressions from the oil-containing raw materials by the process of the present invention.

In the present invention, it is effective to use, as the oil or fat added upon oil expression, an oil or fat that contains 15% or more diacylglycerol, because the useful components in the oil-containing raw material can be extracted at high concentrations and high efficiency by using such an oil or fat. The content of diacylglycerol in the oil or fat is preferably 15 to 100%, more preferably 15 to 95%, more preferably 35 to 95%, more preferably 50 to 93%, even more preferably 70 to 93%, and even more preferably 80 to 90%, because the edible oil obtained by adding such an oil or fat is allowed to contain useful components, such as polyphenols, at high concentrations even if the amount of the oil or fat to be added upon oil expression is decreased. The efficiency of extracting useful components in an oil-containing raw material when the diacylglycerol-containing oil or fat is added differs depending on the characteristics of the useful components contained. Thus, the content of diacylglycerol in the oil or fat to be added upon oil expression is determined by taking into consideration the right balance with the amount of the oil or fat added and using, as a measure, an amount that enables the content of useful components in the edible oil obtained after the oil expression to be preferably at least 20%, more preferably at least 50%, and even more preferably at least 70%, higher than the content of useful components in the oil or fat obtained by the oil expression where no diacylglycerol-containing oil or fat is added.

In the present invention, the oil or fat to be added upon oil expression may contain not only diacylglycerol, but other ordinary oils or fats. Specific examples of such oils or fats include vegetable oils such as olive oil, sesame oil, roasted sesame oil, linseed oil, roasted linseed oil, rapeseed oil, roasted rapeseed oil, rice oil, rice bran oil, nut oil, soybean oil, corn oil, safflower oil, sunflower oil and cottonseed oil; and animal fats such as tallow, lard and fish oil. The oils or fats obtained by subjecting the above oils or fats to separation, by mixing two or more of the above oils or fats, or by controlling the fatty acid composition by hydrogenation or transesterification can also be used as a raw material.

In the present invention, the oil or fat to be added upon oil expression is allowed to contain 15% or more diacylglycerol by (1) hydrolysis using, as a raw material, an oil or fat such as vegetable oil or animal fat described above; (2) by mixing an oil or fat with glycerin and causing glycerolysis; (3) by hydrolyzing an oil or fat to form a fatty acid and then esterifying the fatty acid and, glycerin; (4) by transesterifying the oil or fat as described above and monoglyceride; or (5) by transesterifying monoglyceride. The reactions (1) to (5) may be performed by either a chemical method using chemical catalyst or an enzymatic method using enzymatic catalyst.

In the present invention, preferably the oil or fat to be added upon oil expression contains triacylglycerol at 4.9 to 84.9%, more preferably 4.9 to 64.9%, more preferably 6.9 to 49.9%, even more preferably 6.9 to 29.9%, and even more preferably 9.8 to 19.8%. The maximum value is preferable because it enables the edible oil to contain useful components such as polyphenols at high concentrations even if the amount of the oil or fat to be added upon expression is decreased, whereas the minimum value is preferable in terms of production cost.

In the present invention, preferably the oil or fat to be added upon oil expression contains monoacylglycerol at 0.1 to 5%, more preferably 0.1 to 2%, more preferably 0.1 to 1.5%, even more preferably 0.1 to 1.3%, and even more preferably 0.2 to 1%. The maximum value is preferable in terms of flavor, whereas the minimum value is preferable because it enables the edible oil to contain useful components such as polyphenols at high concentrations even if the amount of the oil or fat to be added upon expression is decreased.

In the present invention, preferably the oil or fat to be added upon oil expression contains 5% or less of free fatty acid (salt), more preferably 0 to 3.5%, more preferably 0 to 2%, even more preferably 0.01 to 1%, and even more preferably 0.05 to 0.5%. The maximum value is preferable in terms of flavor, whereas the minimum value is preferable because it enables the edible oil to contain useful components such as polyphenols at high concentrations even if the amount of the oil or fat to be added upon expression is decreased.

In the present invention, the oil or fat to be added upon oil expression may contain an emulsifier to improve the extraction efficiency. Examples of preferred emulsifiers include polyol fatty acid esters such as lecithin, enzymatically modified lecithin, polyglycerol condensed ricinoleic acid ester, polyglycerol fatty acid ester, sucrose fatty acid ester, glycerol fatty acid ester, sorbitan fatty acid ester, polyoxyethylene sorbitan fatty acid ester and propylene glycol fatty acid ester. When adding an emulsifier, the amount of the emulsifier is preferably 0.01 to 5% and more preferably 0.01 to 2% of the amount of the oil or fat to be added upon oil expression.

In the present invention, the oil or fat to be added upon oil expression may contain an antioxidant to improve the stability of the oil or fat added and/or the oil or fat extracted. Any antioxidants which are usually used in foods may be preferably used. Examples of such antioxidants include natural antioxidants such as vitamin E, vitamin C or the derivatives thereof, phospholipid, rosemary extract, catechin and chlorogenic acid; and synthetic antioxidants such as butylhydroxytoluene (BHT), butylhydroxyanisol (BHA) and tert-butylhydroquinone (TBHQ). When adding an antioxidant, the amount of the antioxidant is preferably 0.005 to 1% and more preferably 0.01 to 0.5% of the amount of the oil or fat after oil expression.

In the present invention, the oil or fat to be added upon oil expression may contain water. From the viewpoint of stability of the oil or fat added and industrial productivity, the content of water in the oil or fat to be added is preferably 0 to 1%, more preferably 0 to 0.5% and even more preferably 0.01 to 0.2%.

The following examples further describe and demonstrate embodiments of the present invention. The examples are given solely for the purpose of illustration and are not to be construed as limitations of the present invention.

EXAMPLES

Preparation of Olive Paste 100 g of olive fruit A (containing 13% of an oil content) was washed with distilled water, frozen in liquid nitrogen, and ground in a mill (WB-1, manufactured by Osaka Chemical Co., Ltd, in the following the same mill was used) for 30 seconds to produce olive paste A. The same procedure was performed for 100 g of olive fruit B (containing 18% of an oil content) to produce olive paste B.

[Preparation of Sesame Paste]

40 g of commercially available roasted sesame seeds was ground in a mill for household use (SKL-A250, manufactured by Tiger Corporation) for one minute to produce sesame paste.

[Measurement Method for Diacylglycerol Content]

The diacylglycerol content in oil or fat was measured by internal standard method using gas chromatography. Trioctanoine (SIGMA Corporation) as an internal standard substance was added to the oil or fat, and the oil or fat was trimethylsilylated and gas-chromatographed. A calibration curve was prepared in advance by making measurement for diolein (SIGMA Corporation) in the same manner as above, and the diacylglycerol content in the oil or fat was calculated using the calibration curve.

[Measurement Method for Polyphenol Content]

The polyphenol content in oil or fat was measured by colorimetry using Folin-Ciocalteu's reagent. To 1 g of oil or fat, 1 mL of normal hexane was added, and polyphenol was extracted with 2 mL of 80% aqueous solution of methanol three times. The extract was dried in a stream of nitrogen, dissolved in acetonitrile to prepare a sample solution. The sample solution was diluted with distilled water, and Folin-Ciocalteu's reagent was added to the diluted sample solution to allow them to react at room temperature for 3 minutes. Then a 35% aqueous solution of sodium carbonate was added to the sample solution and the absorbance at 725 nm was measured. The polyphenol content was calculated using a calibration curve prepared using gallic acid and shown in terms of the concentration equivalent to that of gallic acid.

[Oil or Fat Used]

Diacylglycerol-containing oils or fats having a fatty acid composition and a glyceride composition shown in Table 1 were used. A refined canola oil (manufactured by J-OIL MILLS, Inc.) was used as an ordinary oil or fat composed mainly of triacylglycerol. In Table 1, triacylglycerol was abbreviated to "TAG", diacylglycerol to "DAG", monoacylglycerol to "MAG" and free fatty acid to "FFA".

TABLE 1

| Composition | | DAG-containing oil or fat | Oil or fat composed mainly of TAG |
|---|---|---|---|
| Fatty acid composition (%) | C8:0 | 0.0 | 0.0 |
| | C10:0 | 0.0 | 0.0 |
| | C16:0 | 3.2 | 4.1 |
| | C18:0 | 1.2 | 1.9 |
| | C18:1 | 36.7 | 61.4 |
| | C18:2 | 48.6 | 25.2 |
| | C18:3 | 9.6 | 3.9 |
| | C20:0 | 0.2 | 0.7 |
| | C20:1 | 0.0 | 1.6 |
| | C22:0 | 0.2 | 0.5 |
| | C22:1 | 0.2 | 0.6 |
| Glyceride composition (%) | FFA | 0.1 | 0.0 |
| | MAG | 0.7 | 0.0 |
| | DAG | 87.0 | 1.1 |
| | TAG | 12.2 | 98.9 |

Experimental Example 1

20 g of olive paste and an oil or fat to be added were put in a 50 mL centrifuge tube at each blend ratio shown in Table 2, vigorously shaken and stirred for 1 minute, and centrifuged at 20,000 G for 30 minutes. The oil or fat of the respective supernatants was separated to obtain separated oils 1 to 19. In separated oils 1 and 10, the same procedure was performed with no oil or fat added. Each of the separated oils was measured for its diacylglycerol content and polyphenol content according to the method described above. The results are shown in Table 2.

TABLE 2

| | | Separated oil | | | | | | | | | |
|---|---|---|---|---|---|---|---|---|---|---|---|
| | | 1 | 2 | 3 | 4 | 5 | 6 | 7 | 8 | 9 | 10 |
| Oil-containing raw materials | Olive paste | A | A | A | A | A | A | A | A | A | B |
| | Amount used | 100 | 100 | 100 | 100 | 100 | 100 | 100 | 100 | 100 | 100 |

TABLE 2-continued

| | | | | | | | | | | | |
|---|---|---|---|---|---|---|---|---|---|---|---|
| Amount of oil or fat added (parts) | DAG-containing oil or fat | — | — | — | — | 0.5 | 1 | 2 | 4 | 10 | — |
| | Oil or fat composed mainly of TAG | — | 1 | 4 | 10 | — | — | — | — | — | — |
| DAG content in separated oils (%) | | 2.5 | 2.5 | 2.2 | 2.0 | 4.8 | 7.8 | 12.6 | 21.3 | 38.6 | 2.7 |
| Polyphenol content in separated oils (mg/kg) | | 78 | 79 | 82 | 85 | 106 | 120 | 133 | 154 | 167 | 106 |

| | | Separated oil | | | | | | | | |
|---|---|---|---|---|---|---|---|---|---|---|
| | | 11 | 12 | 13 | 14 | 15 | 16 | 17 | 18 | 19 |
| Oil-containing raw materials | Olive paste | B | B | B | B | B | B | B | B | B |
| | Amount used (parts) | 100 | 100 | 100 | 100 | 100 | 100 | 100 | 100 | 100 |
| Amount of oil or fat added (parts) | DAG-containing oil or fat | — | — | — | — | 5 | 10 | 30 | 50 | 100 |
| | Oil or fat composed mainly of TAG | 10 | 30 | 50 | 100 | — | — | — | — | — |
| DAG content in separated oils (%) | | 2.2 | 2.1 | 2.0 | 2.0 | 20.2 | 31.9 | 58.2 | 66.5 | 74.0 |
| Polyphenol content in separated oils (mg/kg) | | 102 | 96 | 87 | 82 | 131 | 140 | 151 | 148 | 130 |

The results shown in Table 2 reveal that in cases where the diacylglycerol-containing oil or fat was added so that the diacylglycerol content in the oil or fat obtained after oil expression was 4% or more (separated oils 5 to 9 and 15 to 19), the content of polyphenols, as useful components, in the oil or fat obtained after oil expression was higher than that of the oil or fat obtained after oil expression in which the diacylglycerol content was less than 4% (separated oils 1 to 4 and 10 to 14). The results also reveal that the optimum amount of the oil or fat added was about 0.5 to 50 parts per 100 parts of the oil-containing raw material (separated oils 5 to 9 and 15 to 18), though the amount depends on the kind of the oil-containing raw materials, and the obtained oils or fats (separated oils) had a high content of polyphenols and were allowed to contain polyphenols more efficiently.

Experimental Example 2

20 g of sesame paste and an oil or fat to be added were put in a 50 mL centrifuge tube at each blend ratio shown in Table 3, vigorously shaken and stirred for 1 minute, followed by addition of 50 parts of distilled water. The mixture was centrifuged at 20,000 G for 30 minutes, and the oil or fat of the respective supernatants was separated to obtain separated oils 20 to 26. In separated oil 20, the same procedure was performed with no oil or fat added. Each of the separated oils was measured for its diacylglycerol content and polyphenol content according to the method described above. The results are shown in Table 3.

TABLE 3

| | | Separated oil | | | | | | |
|---|---|---|---|---|---|---|---|---|
| | | 20 | 21 | 22 | 23 | 24 | 25 | 26 |
| Oil-containing raw materials | Amount of sesame paste used (parts) | 100 | 100 | 100 | 100 | 100 | 100 | 100 |
| Amount of oil or fat added (parts) | DAG-containing oil or fat | — | — | — | — | 5 | 10 | 20 |
| | Oil or fat composed mainly of TAG | — | 5 | 10 | 20 | — | — | — |
| DAG content in separated oils (%) | | 1.3 | 1.3 | 1.3 | 1.3 | 10.0 | 18.0 | 29.1 |
| Polyphenol content in separated oils (mg/kg) | | 42 | 42 | 43 | 37 | 62 | 68 | 91 |

The results shown in Table 3 reveal that in cases where the diacylglycerol-containing oil or fat was added so that the diacylglycerol content in the oil or fat obtained after oil expression was 4% or more (separated oils 24 to 26), the content of polyphenols, as useful components, in the oil or fat obtained after oil expression (separated oil) was higher than that of the oil or fat obtained after oil expression in which the diacylglycerol content was less than 4% (separated oils 20 to 23).

Experimental Example 3

20 g of oil cake of the olive oil obtained using an olive oil expeller (OLIOMIO, manufactured by Toscana Enologica Mori) and an oil or fat to be added were put in a centrifuge tube at each blend ratio shown in Table 4, and the same procedure as in Experimental example 1 was performed to obtain separated oils 27 to 32. Each of the separated oils was measured for its diacylglycerol content and polyphenol content according to the method described above. The results are shown in Table 4.

TABLE 4

| | | Separated oil | | | | | |
|---|---|---|---|---|---|---|---|
| | | 27 | 28 | 29 | 30 | 31 | 32 |
| Oil-containing | Amount of olive oil | 100 | 100 | 100 | 100 | 100 | 100 |

TABLE 4-continued

| | | Separated oil | | | | | |
|---|---|---|---|---|---|---|---|
| | | 27 | 28 | 29 | 30 | 31 | 32 |
| raw materials (parts) | cake used | | | | | | |
| Amount of oil or fat added (parts) | DAG-containing oil or fat | — | 0.5 | 1.0 | 3.0 | 6.0 | 10 |
| | Oil or fat composed mainly of TAG | 10 | 9.5 | 9.0 | 7.0 | 4.0 | — |
| DAG content in oil or fat added (%) | | 1.1 | 6.0 | 10.7 | 30.3 | 50.2 | 78.0 |
| DAG content in separated oils (%) | | 1.5 | 4.7 | 7.4 | 21 | 34 | 58 |
| Polyphenol content in separated oils (mg/kg) | | 34 | 39 | 44 | 69 | 96 | 163 |

The results shown in Table 4 reveal that in cases where the diacylglycerol-containing oil or fat was added so that the diacylglycerol content in the oil or fat obtained after oil expression was 4% or more (separated oils 28 to 32), the content of polyphenols, as useful components, in the oil or fat obtained after oil expression (separated oil) was higher than that of the oil or fat obtained after oil expression in which the diacylglycerol content was less than 4% (separated oil 27).

The invention claimed is:

1. A process for producing an edible oil, comprising adding 0.5 to 50 parts by weight of a diacylglycerol-containing oil or fat that comprises 35 to 95% by weight of diacylglycerol relative to 100 parts by weight to an oil-containing material thereby forming a mixture, and then expressing an edible oil from said mixture so that the diacylglycerol content in the edible oil obtained after the oil expression is 20 to 80% by weight, wherein the oil-containing raw material is selected from the group consisting of olive fruit, non-roasted sesame seeds, roasted sesame seeds, evening primrose seeds, camellia seeds, non-roasted coffee beans, roasted coffee beans, non-roasted linseeds, roasted linseeds, non-roasted rapeseeds, roasted rapeseeds, rice bran, nuts, avocado fruit, pumpkin seeds, grape seeds, soy beans, corn germs, safflower seeds, sunflower seeds, cottonseeds, olive seeds, and wheat bran, or an oil cake left after one or more times of oil expression therefrom.

2. The process for producing an edible oil according to claim 1, wherein the edible oil contains an amount of polyphenols that is larger than an amount obtained when the diacylglycerol content in the edible oil obtained after the oil expression is less than 4% by weight.

3. The process for producing an edible oil according to claim 1, wherein the diacylglycerol content in the edible oil obtained after the oil expression is 30% to 70% by weight.

4. The process for producing an edible oil according to claim 1, wherein the amount added is 1 to 45 parts by weight.

5. The process for producing an edible oil according to claim 1, wherein the amount added is 3 to 40 parts by weight.

6. The process for producing an edible oil according to claim 1, wherein the amount added is 5 to 30 parts by weight.

7. The process for producing an edible oil according to claim 1, wherein the oil or fat added to the oil-containing raw material contains 50 to 93% by weight diacylglycerol.

8. The process for producing an edible oil according to claim 1, wherein the oil or fat added to the oil-containing raw material contains 70 to 93% by weight diacylglycerol.

9. The process for producing an edible oil according to claim 1, wherein the oil or fat added to the oil-containing raw material contains 80 to 90% by weight diacylglycerol.

10. The process for producing an edible oil according to claim 1, wherein the oil or fat added to the oil-containing raw material contains 4.9 to 84.9% by weight triacylglycerol.

11. The process for producing an edible oil according to claim 1, wherein the oil or fat added to the oil-containing raw material contains 0.1 to 5% by weight monoacylglycerol.

12. The process for producing an edible oil according to claim 1, wherein the oil or fat added to the oil-containing raw material contains 5% by weight or less of free fatty acid or a salt thereof.

13. The process for producing an edible oil according to claim 1, wherein the oil-containing raw material is selected from the group consisting of olive fruit, olive seeds, and sesame seeds.

* * * * *